US006515881B2

(12) United States Patent
Chou et al.

(10) Patent No.: US 6,515,881 B2
(45) Date of Patent: Feb. 4, 2003

(54) INVERTER OPERABLY CONTROLLED TO REDUCE ELECTROMAGNETIC INTERFERENCE

(75) Inventors: John Chou, Monterey Park, CA (US); Ching-Chuan Kuo, Hsin Chu (TW)

(73) Assignee: $O_2$ Micro International Limited, Grand Cayman (KY)

( * ) Notice: Subject to any disclaimer, the term of this patent is extended or adjusted under 35 U.S.C. 154(b) by 0 days.

(21) Appl. No.: 09/873,669

(22) Filed: Jun. 4, 2001

(65) Prior Publication Data

US 2002/0181260 A1 Dec. 5, 2002

(51) Int. Cl.[7] .......................... H02M 3/335; G05F 1/00

(52) U.S. Cl. ........................... 363/95; 363/78; 315/308

(58) Field of Search ............................ 363/16, 74, 78, 363/79, 87, 95, 97, 98, 131, 132; 315/219, 307, 308

(56) References Cited

U.S. PATENT DOCUMENTS 5,491,624 A * 2/1996 Levran et al. ................ 363/87
5,691,607 A * 11/1997 Zawislak et al. ........... 315/308
5,936,357 A 8/1999 Crouse et al. .............. 315/247
6,114,814 A 9/2000 Shannon et al. ............ 315/219
6,259,615 B1 7/2001 Lin ............................. 363/98

* cited by examiner

*Primary Examiner*—Jessica Han
(74) *Attorney, Agent, or Firm*—Grossman Tucker Perreault & Pfleger, PLLC

(57) ABSTRACT

A lamp load control system that includes a lamp controller comprising an inverter generating an AC signal from a DC signal, a load coupled to the inverter, and a feedback circuit coupled to the load generating a feedback signal indicative of power supplied to the load. In one exemplary embodiment, the system also includes a command signal generator generating a command signal indicative of a preferred power output of the inverter; wherein the command signal is combined with the feedback signal to cause the controller to temporarily reduce power delivered to the load. In another exemplary embodiment, the system includes a command signal generator generating a command signal indicative of a preferred power output of said inverter; wherein the controller receives the feedback signal and the command signal and temporarily reduces power delivered to the load based on the value of the feedback signal or the command signal.

24 Claims, 3 Drawing Sheets

INVERTER OPERABLY CONTROLLED TO REDUCE ELECTROMAGNETIC INTERFERENCE

FIELD OF THE INVENTION

The present invention relates to a system for controlling an inverter to generate a predetermined power output during certain external processes. More particularly, the present invention provides a control system for an inverter delivering power to a backlight display that reduces electromagnetic interference during read/write commands. Particular utility for the present invention is in Palm Computer devices, or other computer devices where the LCD panel and the system board are in relative close proximity to one another, although the present invention has equal utility in any application where it is desirable to control the output of the inverter during certain computer system processes.

BACKGROUND OF THE INVENTION

Palm Computers typically comprise a pen which interfaces between the users and the CPU via an LCD panel. A sensor detects pressure from the tip of the pen and sends the appropriate commands to the CPU. A D/A converter is provided that receives the analog signal generated by the sensor and converts this signal to a digital signal to be executed by the CPU. The A to D converter interfaces between the pen and the CPU. Since the size of a typical Palm Computer is relatively small, the mother board is mounted in close proximity to the LCD panel. LCD panels include a control module, a DC to AC inverter, and one or more cold cathode fluorescent lamps. During normal operation, the LCD panel radiates electromagnetic waves that can interfere with the read/write process of the CPU, or other components on the mother board of the Palm Computer. The A/D converter is particularly susceptible to electromagnetic interference.

One solution to alleviate the electromagnetic interference between the LCD display and the components of the motherboard is shielding. However, shielding an LCD panel has proven to be expensive, not reliable, and not very effective. Also, shielding adds undesirable weight to small computer systems such as Palm Computers.

FIG. 1 depicts a lamp driving circuit 10 that includes a CCFL controller for driving one or more cold cathode fluorescent lamps 14 via a transformer 16 and a resonant tank circuit that includes a secondary side of the transformer 16 and capacitor 18. A feedback circuit 20 is provided to provide a DC signal indicative of lamp current conditions, and is utilized by the CCFL controller to adjust power to the load. The CCFL controller can include inverter topologies well known in the art, for example, full bridge, half bridge or push-pull inverter topologies. The solution to electromagnetic interference depicted in FIG. 1 includes an on/off signal, generated externally, that shuts off the switching mechanisms (i.e., half bridge, full bridge or push pull switches) on command. The command to shut off the CCFL controller via on/off signal 22 may be generated by the system microprocessor (not shown) during periods where electromagnetic energy coming from the lamp would interfere with read/write processes of the microprocessor, memory, or the D/A converter interfacing between the pen and the microprocessor.

Disadvantageously, by shutting off the controller 12, even for small periods of time, no drive signals are supplied to the switches, and hence, the CCFL controller generates zero volts to the transformer (and the load). As is well understood in the art, CCFL lamps require a high voltage striking period to initially strike the lamp, followed by steady state period where lower lamp voltage can be supplied to operate the lamp. Typically, the striking voltage is on the order of 1500 volts and steady state voltage is on the order of 500 to 600 volts. In the solution depicted in FIG. 1, every time the controller 12 receives a command via on/off signal 22 to turn on the lamp, the controller 12 must go through the striking period to first strike the lamp. CCFL controller may include a soft "soft start" or frequency sweeping functionality to provide lamp strike, and in any event, require several hundred milliseconds to strike the lamp. Thus, if the microprocessor shuts off the controller 12 to perform a read/write process which may take only 2 or three milliseconds, when the controller 12 is turned on again the lamp needs to be struck, so the whole process may take several hundred milliseconds to complete. This approach may introduce a noticeable flicker on the LCD display.

SUMMARY OF THE INVENTION

In one exemplary embodiment, the present invention provides a lamp load control system. The system includes a lamp controller comprising an inverter to generating an AC signal from a DC signal, a load coupled to the inverter, and a feedback circuit coupled to the load generating a feedback signal indicative of power supplied to the load. The system also includes a command signal generator generating a command signal indicative of a preferred power output of said inverter. The command signal is combined with the feedback signal to cause the controller to temporarily reduce power delivered to the load.

In another exemplary embodiment, the present invention provides another lamp load control system. The system includes a lamp controller comprising an inverter generating an AC signal from a DC signal, a load coupled to the inverter, and a feedback circuit coupled to the load generating a feedback signal indicative of power supplied to the load. The system also includes a command signal generator generating a command signal indicative of a preferred power output of said inverter. The controller receives the feedback signal and the command signal and temporarily reduces power delivered to the transformer based on the value of said feedback signal or said command signal.

The present invention further provides a method to control a lamp load. The method comprises the steps of: supplying power to a lamp; generating a feedback signal indicative of power supplied to the lamp; generating a command signal indicative of a preferred power delivered to the lamp; combining the feedback signal and the command signal; and temporarily reducing the power delivered to the lamp.

The present invention provides yet another method to control a lamp load, comprising the steps of: supplying power to a lamp; generating a feedback signal indicative of power supplied to the lamp; generating a command signal indicative of a preferred power delivered to the lamp; and temporarily reducing power delivered to the lamp based on the command signal or the feedback signal.

It will be appreciated by those skilled in the art that although the following detailed description will proceed with reference being made to exemplary embodiments, the present invention is not intended to be limited to these exemplary embodiments. Other features and advantages of the present invention will become apparent as the following detailed description proceeds, and upon reference to the drawings, wherein like numerals depict like parts, and wherein:

DETAILED DESCRIPTION OF THE INVENTION

Figure 1:
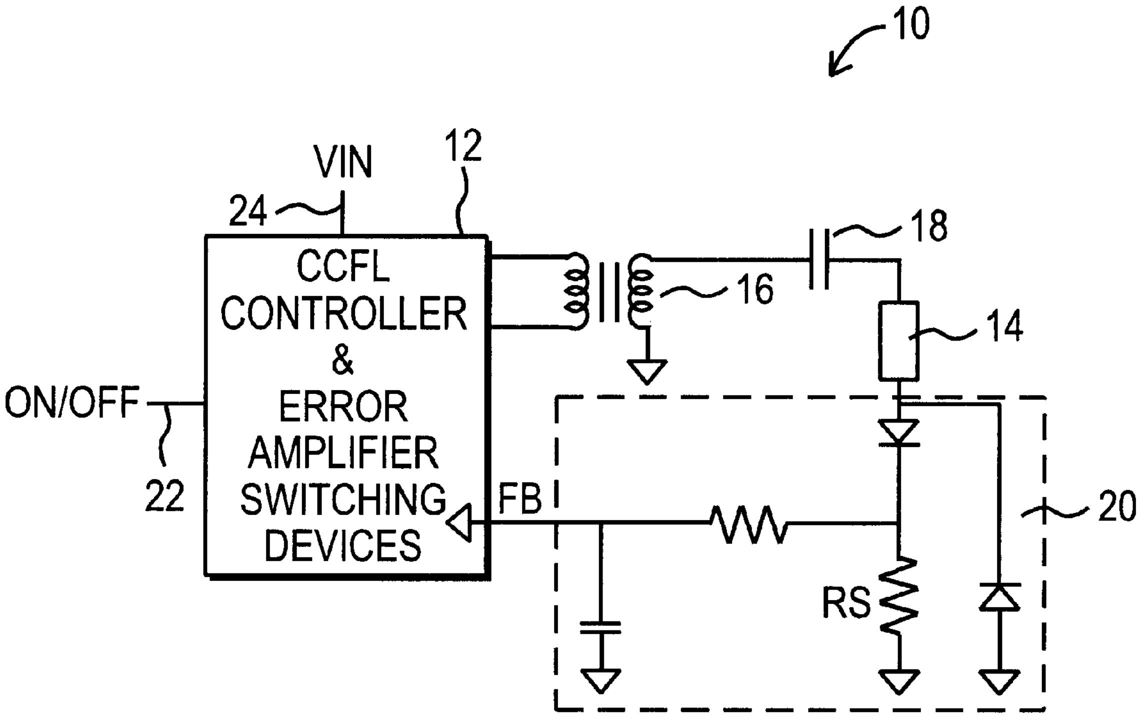
FIG. 1 PRIOR ART
FIG. 1 depicts a lamp driving system of the prior art.
Figure 2:
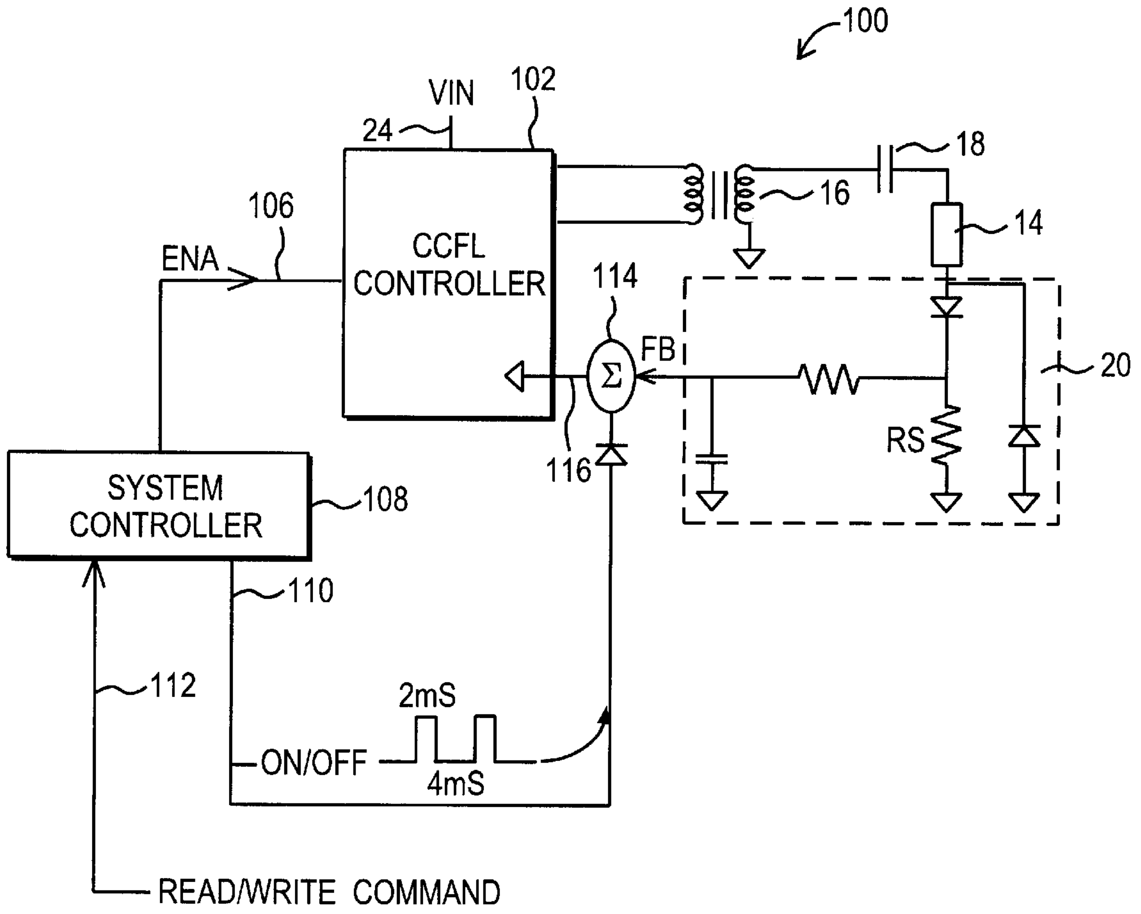
FIG. 2 depicts an exemplary lamp driving system according to the present invention.

FIG. 2 depicts an exemplary lamp driving system 100 according to the present invention. A lamp driving system 100 in this exemplary embodiment includes similar components as described above with reference to FIG. 1., i.e., a transformer 16, a tank circuit comprising the secondary side of the transformer 16 along with capacitor 18, one or more CCFLs 14 and a current feedback circuit 20. Current feedback circuit 20 generally comprises a sense resistor Rs that provides a feedback signal proportional to the current delivered to the lamp load. Feedback current control is well understood in the inverter art and is generally characterized as a method to receive load current information and adjust current delivered to the load based thereon. The controller 102 is modified to compare the feedback signal with a predetermined threshold and adjust the current delivered to the lamp accordingly. If the feedback signal meets or exceeds this threshold value, the controller operates to deliver minimum current to the lamp load until the feedback signal is reduced below the threshold. A DC input source voltage 24 is utilized by the switching topology to convert from a DC signal to an AC signal which is supplied to the transformer 16. For discussing the exemplary embodiment of FIG. 2, a description of a full bridge type CCFL controller is provided below.

U.S. patent application Ser. No. 09/437,081, filed Nov. 9, 1999, now U.S. Pat. No. 6,259,615 and assigned to the same Assignee, is hereby incorporated by reference in its entirety. In the '081 application, a CCFL controller is provided that includes a plurality of switches (e.g., MOSFETS) connected in a full bridge/H-bridge topology to invert a DC signal to an AC signal via a transformer and a tank circuit. In pertinent part, the '081 application discloses methodology for controllably delivering power to the load by controlling the overlap time, i.e., phase, between opposing legs of the full bridge circuit. In this manner, the on times of opposing switches can be controlled which will vary the power to the load. Power to the load may be varied intentionally by a dimming command or by anomalous conditions (e.g. open circuit, or short circuit) at the load. The '081 application also discloses feedback circuitry to provide an indication of, among other things, current at the lamp. A feedback signal thus generated is used by the controller to adjust the overlap times of the opposing switches in the full bridge circuit thereby adjusting power at the load. It will be understood by those skilled in the art that the CCFL controller 102 of the present invention may comprise a full bridge, phase shifted topology such as disclosed in the aforementioned patent and may further include all or part of the feedback circuitry described therein.

The lamp driver controller circuit system 100 of the present invention includes a CCFL controller 102 such as described above and a system controller 108. The system 100 is adapted to controllably reduce the voltage at the lamp 14 during, for example, read/write processes in a Palm Computer. The system controller 108 may comprise the system microprocessor appropriately adapted with hardware and/or software to generate signals as described below, or may comprise a dedicated controller for generating CCFL lamp control signals. However, it should be understood at the outset that the CCFL controller of the present invention can be modified to monitor the status of read/write operations of the system and generate a power command signal, as described below. Thus, the exemplary embodiment need not necessarily include the use of a system controller, but is described thusly for purposes of clarity. Although a system controller and CCFL controller depicted in FIG. 2 will be described below in reference to a Palm Computer, those skilled in the art will recognize that the field of use for the present invention is not limited to a Palm Computer application, and has broad scope anywhere where electromagnetic interference needs to be reduced or eliminated.

System controller 108 generates an enable signal 106 to turn on the CCFL controller 102 to deliver power to the lamp 14. Unlike the solution depicted in FIG. 1, once enabled via enable signal 106, the controller of the present invention does not shut the controller 102 off thereby shutting the lamp off, rather the present invention utilizes a feedback technique to minimize the voltage appearing at the lamp to reduce or eliminate electromagnetic interference, while maintaining a sufficient voltage at the lamp to ensure that the lamp does not require a strike voltage after each read/write period. In one sense, the present invention provides a system and methodology for feedback control of a lamp during certain system events, for example, read/write processes. By manipulating a conventional feedback signal, the present invention causes the inverter to deliver a desired minimal power during a specified time period.

In the exemplary embodiment, system controller 108 receives a read/write command 112. The read/write command 112 may include, for example, a read or write command from the LCD display to the microprocessor. Upon receiving the read/write command 112, system controller 108 generates a command signal 110 having a predetermined on/off duration. In one exemplary embodiment, the command pulse signal 110 is combined with the feedback signal FB generated by the feedback circuitry 20 indicative of the current supplied to the lamp. The command signal 110 is indicative of a preferred power output of the inverter, or viewed another way, the command signal 110 is indicative of a preferred power delivered to the lamp. The combination of the command pulse signal 110 and the current feedback signal causes the controller 102 to temporarily reduce voltage delivered to the transformer 16 thereby reducing the voltage supplied to the lamp 14, as will be described in greater detail below.

As shown in FIG. 2, an on/off command signal 110 of a predetermined duration is combined with the feedback signal (FB) generated by feedback circuitry 20 indicative of the current supplied to the lamp to cause the CCFL controller 102 to generate a minimal voltage when the on/off signal 110 is on. To that end, a summer circuit 114 is provided to sum the on/off signal 110 with the feedback signal FB to generate a modified feedback signal 116 which is utilized to control the operation of the CCFL controller 102. In essence, when signal 110 is ON (or active), the CCFL controller 102 initiates a minimum phase between complimentary diagonal switches within the full bridge switching topology thereby delivering minimal current to the load but still maintaining a minimal voltage at the primary side of the transformer 16 sufficient to keep the lamp struck. Thus, the modified feedback signal 116 includes a first state that is proportional to the feedback signal (FB) and a second state that is indicative of the combination of the feedback signal and the command signal. Since the feedback signal and the ON signal 110 are summed, the ON signal should have a value sufficient to be read by the CCFL controller as an over current condition which causes the CCFL controller 102 to force the full bridge switching topology into a minimum phase switching arrangement. This may mean, for example, the chosen value for the ON portion of the command signal 110 is approximately equal to that of the feedback threshold. Note that, as opposed to the solution depicted in FIG. 1, the switches are still conducting but are delivering a predetermined minimum current to the load, and are delivering a voltage sufficient to keep the lamp struck. During the OFF portion of signal 110, signal 116 is essentially the value of the feedback signal FB, but unlike the prior art, the OFF portion of the command signal 110 does not shut the controller off.

Alternatively, instead of combining the command signal 110 with the feedback signal, it is contemplated herein that the lamp controller can be appropriately adapted to accept the command signal as an input (separate from the feedback signal), such that the controller is modified with appropriate circuitry to, in the absence of an active command signal, adjust power to the lamp based on the feedback signal, and when the command signal is activated, power to the lamp is adjusted based on the command signal. In this alternative, summing circuit 114 is not necessary since the feedback signal and command signal are not combined. Such an embodment may be implemented, for example, with choosing circuitry (not shown) that chooses between the feedback signal and the command signal. Such a decision may be based on, for example, the relative strengths of the feedback and command signal, a predetermined threshold, etc.

Since the human eye can detect a flicker if the on/off cycle of the lamp is greater than $1/24^{th}$ of a second, the time period of command signal 110, in the exemplary embodiment, is chosen to insure that the on/off period is less than $1/24^{th}$ of a second. Accordingly, in the exemplary embodiment of FIG. 2, signal 110 has an on duration of 2 milliseconds and an off duration of 4 milliseconds, for a total on/off cycle of 6 milliseconds. Of course, those skilled in the art will recognize that this time period is merely provided as an example, and may be chosen in accordance with the particular operating characteristics of the load. For example, it may be that there is no requirement for a particular application to reduce flicker of a lamp, and in such a case the on/off cycle may be greater than or less than the human threshold for detection of a flicker. In operation, system controller 108 receives a read/write command 112, for example, a read/write command from the screen into memory. Upon receipt of the read/write command 112, system controller generates the on/off signal 110 having a predetermined time period, for example, 2 millisecond/4 millisecond on/off cycle. The read or write process is then conducted when the on/off signal is on, i.e., when the CCFL controller forces the lamp into a minimal power mode thereby reducing electromagnetic emissions. System controller 108 also generates an enable signal 106 which turns on the CCFL controller 102 during normal operation, but is not utilized to turn off the CCFL controller during read/write command as is the case in the system shown in FIG. 1. For cases where a read/write operation will take longer than the on period of signal 110, system control may be adapted to either adjust the on period to a greater amount to permit the read or write process to occur in one cycle, or system controller may be adapted to parse the read or write process in accordance with the on period of signal 110 over several on/off cycles.

Figure 3:
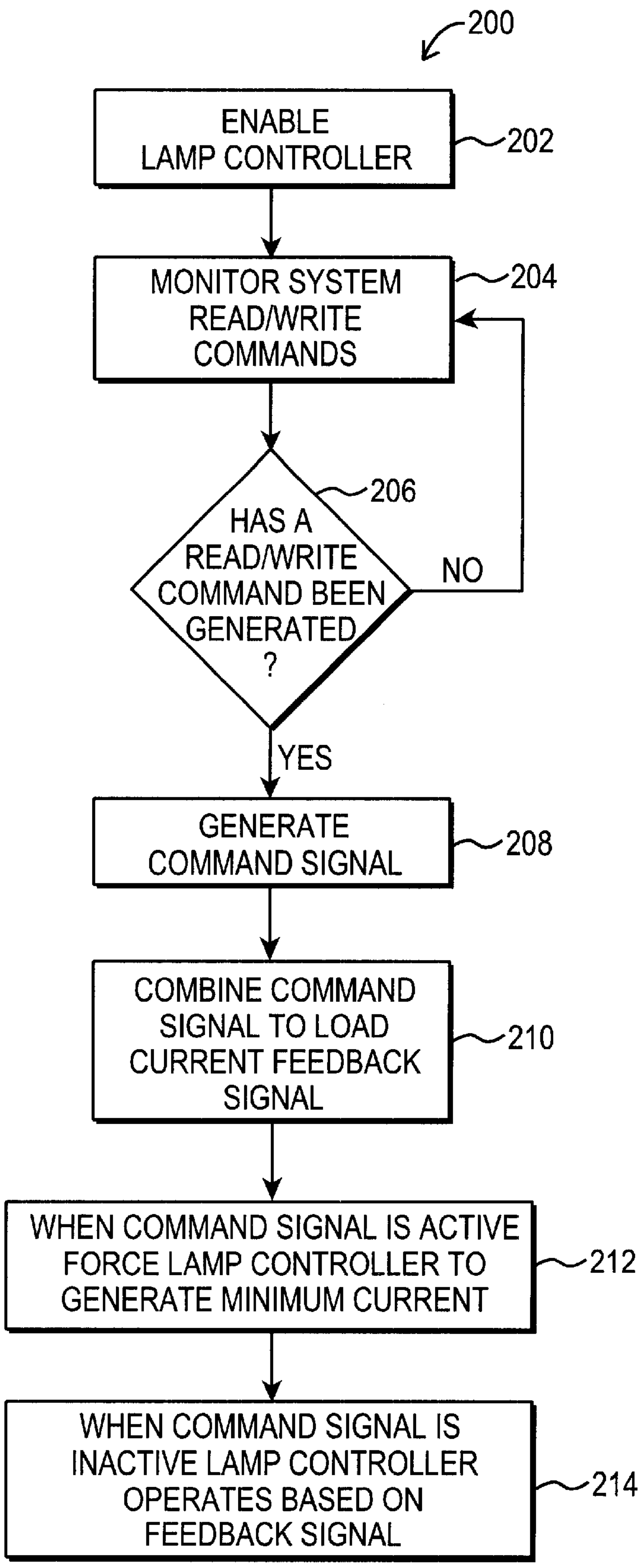
FIG. 3 depicts an exemplary flowchart for control of a lamp driving system in accordance with the present invention.

FIG. 3 depicts an exemplary flowchart 200 for control of a lamp driving system in accordance with the present invention. The lamp controller is enabled 202. A system controller (or appropriately adapted lamp controller) monitors the system for read/write commands 204. The system controller determines if a read/write command has been generated 206. If not the system controller continues monitoring for a read/write event. If yes, the system controller generates a command signal 208 indicative of a desired power condition at the load. The command signal is combined with a load feedback signal 210. When the command signal is active, the lamp controller reduces the lamp current to a predetermined minimum value 212. When the command signal is inactive, the lamp controller operates based on the lamp load feedback signal 214.

Modifications to the present invention may be made. For example, the description above recites that the ON signal should have a value sufficient to be read by the CCFL controller as an over current condition which causes the CCFL controller 102 to force the full bridge switching topology into a minimum phase switching arrangement. So that, for example, the chosen value for the ON portion of the command signal 110 is approximately equal to that of the feedback threshold. Alternatively, it may be determined that electromagnetic interference from the lamp is tolerable up to a certain lamp current threshold. In this instance, the system controller may be modified to monitor the feedback signal FB, and generate the ON/OFF signal, regardless of the presence of a read/write command, only when the feedback signal exceeds a certain lamp current threshold (which would mean that the ON portion of the command signal may have a value correspondingly less than the minimum threshold value of the feedback circuit). Still other modifications may be made. For example, the description set forth above details the operation of the circuit of FIG. 2 during read/write operations, to reduce or eliminate EM noise. However, the present invention is not intended to be limited only to read/write operations or reduction of EM noise. Thus, as a general statement, the system controller 108 can be modified to generate the command signal 110 upon any system instance where a complete shut-off of the lamp controller is unnecessary or undesirable.

Still further modifications may be made. For example, the exemplary embodiments described herein teach the use of the command on/off signal 110 to force the controller to minimize current output during the on time of the signal (for example, by causing the controller to force the switches into a minimal overlap condition). However, the present invention need not necessarily reduce the lamp current to a minimal value, rather, the amount of acceptable lamp current for a given operation may be quantitatively determined. In this case, rather than reduce lamp current to a minimum, the controller may be controlled via the command signal to deliver an acceptable amount of current. Thus, "minimum" as used herein may not necessarily mean zero or the minimum amount of current provided by the lamp controller, but rather "minimum" is intended to be defined as a desired minimal power output current for a given operation (e.g., data read/write, etc.) and/or a given desired result (e.g., reduction of EM noise).

Those skilled in the art will readily recognize the inverter topologies described herein, i.e., full bridge/H-bride, half bridge, push-pull, etc. It is to be understood that the present invention may utilize any one of these types of inverter topologies, and that the controller 102 may further comprise circuitry to control the phase of the switches (to control lamp current), also well-understood in the art. Of course, the controllers may also be modified with dimming control circuitry (e.g., burst mode dimming (PWM dimming), operating frequency dimming, phase control dimming, analog dimming, and/or other dimming control circuitry), or more exotic variations of these inverter topologies, without departing from the scope of the present invention. It will also be readily apparent that the description of the command pulse signal 110 provided herein assumes an active high (ON) portion and low (OFF) portion, however the present invention is equally applicable to active low signals and circuits. Those skilled in this art will recognize that numerous other modifications may be made, and all such modifications are deemed within the spirit and scope of the present invention, as defined by the appended claims.

What is claimed is:

1. A lamp load control system, comprising:

a lamp controller comprising an inverter comprised of a plurality of switches for generating an AC signal from a DC signal, a transformer coupled to said switches receiving said AC signal and generating a sinusoidal AC signal, a load coupled to said transformer and receiving said sinusoidal AC signal, and a feedback circuit coupled to said load generating a feedback signal indicative of power supplied to said load; and a command signal generator generating a command signal indicative of a preferred power output of said inverter; wherein said command signal is combined with said feedback signal thereby causing said controller to temporarily reduce power delivered to said transformer thereby reducing power supplied to said lamp.

2. A system as claimed in claim 1, wherein said command signal generator monitoring a read or write process and generating said command signal if a read or write process is present.

3. A system as claimed in claim 1, further comprising a summing circuit combining said feedback signal and said command signal and generating a modified feedback signal having a first state proportional to said feedback signal and a second state proportional to the combination of said feedback signal and said command signal.

4. A system as claimed in claim 1, wherein said command signal is a pulse signal having a predetermined active and inactive state, and wherein when said command signal is active, the combination of said active command signal and said feedback signal causing said controller to temporarily reduce power delivered to said transformer, and wherein when said command signal is inactive said controller controls power to said transformer based on said feedback signal.

5. A system as claimed in claim 1, wherein said reduction of power delivered to said load comprises a reduction of lamp current to a predetermined threshold so that electromagnetic interference generated by said lamp is at a predetermined minimum.

6. A lamp load control system, comprising:

a lamp controller comprising an inverter comprised of a plurality of switches for generating an AC signal from a DC signal, a transformer coupled to said switches receiving said AC signal and generating a sinusoidal AC signal, a load coupled to said transformer and receiving said sinusoidal AC signal, and a feedback circuit coupled to said load generating a feedback signal indicative of power supplied to said load; and a command signal generator generating a command signal indicative of a preferred power output of said inverter; wherein said controller receives said feedback signal and said command signal and temporarily reduces power delivered to said transformer based on the value of said feedback signal or said command signal.

7. A system as claimed in claim 6, wherein said command signal generator monitoring a read or write process and generating said command signal if a read or write process is present.

8. A system as claimed in claim 6, wherein said command signal is a pulse signal having a predetermined active and inactive state, and wherein when said command signal is active, the combination of said active command signal and said feedback signal causing said controller to temporarily reduce power delivered to said transformer, and wherein when said command signal is inactive said controller controls power to said transformer based on said feedback signal.

9. A system as claimed in claim 6, wherein said reduction of power delivered to said load comprises a reduction of lamp current to a predetermined threshold so that electromagnetic interference generated by said lamp is at a predetermined minimum.

10. A lamp load control system, comprising:

a lamp controller comprising an inverter generating an AC signal from a DC signal, a load coupled to said inverter, and a feedback circuit coupled to said load generating a feedback signal indicative of power supplied to said load; and a command signal generator generating a command signal indicative of a preferred power output of said inverter; wherein said command signal is combined with said feedback signal thereby causing said controller to temporarily reduce power delivered to said load.

11. A system as claimed in claim 10, further comprising a summing circuit combining said feedback signal and said command signal and generating a modified feedback signal having a first state proportional to said feedback signal and a second state proportional to the combination of said feedback signal and said command signal.

12. A system as claimed in claim 10, wherein said command signal is a pulse signal having a predetermined active and inactive state, and wherein when said command signal is active, the combination of said active command signal and said feedback signal causing said controller to temporarily reduce power delivered to said load, and wherein when said command signal is inactive said controller controls power to said transformer based on said feedback signal.

13. A system as claimed in claim 10, wherein said command signal generator monitoring a read or write process and generating said command signal if a read or write process is present.

14. A system as claimed in claim 10, wherein said reduction of power delivered to said load comprises a reduction of lamp current to a predetermined threshold so that electromagnetic interference generated by said lamp is at a predetermined minimum.

15. A lamp load control system, comprising:

a lamp controller comprising an inverter generating an AC signal from a DC signal, a load coupled to said inverter, and a feedback circuit coupled to said load generating a feedback signal indicative of power supplied to said load; and a command signal generator generating a command signal indicative of a preferred power output of said inverter; wherein said controller receives said feedback signal and said command signal and temporarily reduces power delivered to said transformer based on the value of said feedback signal or said command signal.

16. A system as claimed in claim 15, wherein said command signal is a pulse signal having a predetermined active and inactive state, and wherein when said command signal is active, the combination of said active command signal and said feedback signal causing said controller to temporarily reduce power delivered to said load, and wherein when said command signal is inactive said controller controls power to said transformer based on said feedback signal.

17. A system as claimed in claim 15, wherein said command signal generator monitoring a read or write process and generating said command signal if a read or write process is present.

18. A system as claimed in claim 15, wherein said reduction of power delivered to said load comprises a reduction of lamp current to a predetermined threshold so that electromagnetic interference generated by said lamp is at a predetermined minimum.

19. A method to control a lamp load, comprising the steps of:

supplying power to a lamp;

generating a feedback signal indicative of power supplied to said lamp;

generating a command signal indicative of a preferred power delivered to said lamp;

combining said feedback signal and said command signal; and temporarily reduce said power delivered to said lamp.

20. A method as claimed in claim 19, further comprising the steps of:

monitoring a read or write command; and generating said command signal in the presence of a read or write command.

21. A method as claimed in claim 19, wherein said step of temporarily reducing said power delivered to said lamp comprises reducing lamp current to a predetermined threshold so that electromagnet interference generated by said lamp is at a predetermined minimum.

22. A method to control a lamp load, comprising the steps of:

supplying power to a lamp;

generating a feedback signal indicative of power supplied to said lamp;

generating a command signal indicative of a preferred power delivered to said lamp; and temporarily reducing power delivered to said lamp based on said command signal or said feedback signal.

23. A method as claimed in claim 22, further comprising the steps of:

monitoring a read or write command; and generating said command signal in the presence of a read or write command.

24. A method as claimed in claim 22, wherein said step of temporarily reducing said power delivered to said lamp comprises reducing lamp current to a predetermined threshold so that electromagnetic interference generated by said lamp is at a predetermined minimum.

* * * * *

UNITED STATES PATENT AND TRADEMARK OFFICE

CERTIFICATE OF CORRECTION

PATENT NO. : 6,515,881 B2
DATED : February 4, 2003
INVENTOR(S) : John Chou and Ching-Chuan Kuo It is certified that error appears in the above-identified patent and that said Letters Patent is hereby corrected as shown below:

Title page,
Item [73], Assignee, please change to read -- O2Micro International Limited --.

Signed and Sealed this

Twelfth Day of August, 2003

JAMES E. ROGAN
*Director of the United States Patent and Trademark Office*